United States Patent [19]
Daane et al.

[11] 3,891,497
[45] June 24, 1975

[54] NON-AQUEOUS DEFIBERIZING PROCESS OF WASTE PAPER IN THE PRESENCE OF STEAM AND A LIQUID NONMISCIBLE IN WATER, E.G., TETRACHLORETHYLENE

[75] Inventors: Robert A. Daane, Rockton; Shu Tang Han, South Beloit, both of Ill.

[73] Assignee: Beloit Corporation, Beloit, Wis.

[22] Filed: Mar. 22, 1973

[21] Appl. No.: 343,841

[52] U.S. Cl. ........................ 162/6; 162/4; 162/189; 241/28; 241/29
[51] Int. Cl. ........................ D21b 1/08; D21c 5/02
[58] Field of Search .............. 162/4, 5, 6, 191, 264, 162/189; 241/16, 24, 28, 29; 210/404

[56] References Cited
UNITED STATES PATENTS

| | | | |
|---|---|---|---|
| 2,912,174 | 11/1959 | Bidwell | 241/28 X |
| 3,058,871 | 10/1962 | Davis et al. | 162/5 |
| 3,245,868 | 4/1966 | Espenmiller et al. | 162/4 |
| 3,255,888 | 6/1966 | Balfour | 210/404 X |
| 3,595,741 | 7/1971 | Goss | 162/5 |
| 3,661,328 | 5/1972 | Leask | 241/28 X |
| 3,741,863 | 6/1973 | Brooks | 162/4 |

*Primary Examiner*—S. Leon Bashore
*Assistant Examiner*—Alfred D'Andrea, Jr.
*Attorney, Agent, or Firm*—Hill, Gross, Simpson, Van Santen, Steadman, Chiara & Simpson

[57] ABSTRACT

A mechanism and method for defibering waste paper in a manner which yields dry separate fibers including means for removing air from the waste and adding a controlled amount of aqueous moisture, mechanically defiberizing the waste in a solution of nonmiscible liquid, screening the defiberized waste to remove the nonmiscible liquid and adding a fresh nonmiscible liquid thereto, further defiberizing the waste mechanically under higher than atmospheric pressure and releasing the waste to a demoisturizer chamber maintained at temperatures to evaporate the water, and thereafter pressing the nonmiscible liquid from the waste and thereafter forcing superheated steam therethrough to remove the remaining nonmiscible fluid.

15 Claims, 1 Drawing Figure

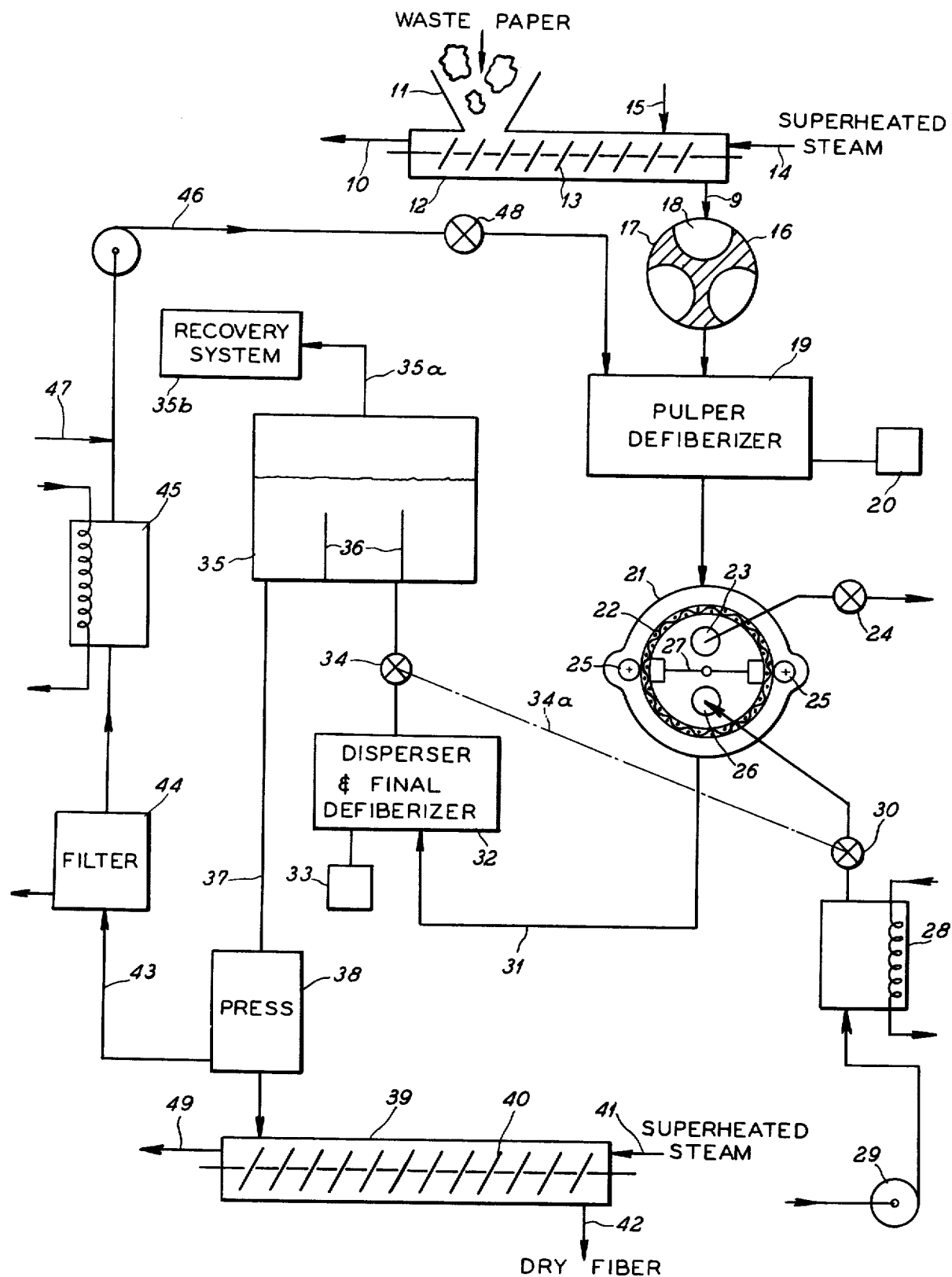

3,891,497

NON-AQUEOUS DEFIBERIZING PROCESS OF WASTE PAPER IN THE PRESENCE OF STEAM AND A LIQUID NONMISCIBLE IN WATER, E.G., TETRACHLORETHYLENE

BACKGROUND OF THE INVENTION

The present invention in general relates to the recovery of pulp fibers suitable for making paper from waste paper containing contaminants.

In a recovery of pulp from waste paper, it is essential to obtain the highest quality pulp fibers possible wherein the process does not damage the fibers, but yields dry separate fibers capable of making a relatively good quality paper. Efforts have heretofore been directed at the recovery of pulp from waste paper to obtain a dry pulp, but such efforts have generally resulted in damage to the fibers during processing.

An object of the present invention is to provide a mechanism and process for defibering waste paper by disintegrating it into individual fibers in a manner which yields dry, separate fibers wherein the process imparts a minimum of damage to the fibers, and at most no more damage than is imparted by conventional defibering or pulping processes carried out in water. Reducing waste paper to dry individual fibers, rather than aqueous slurries or wet pulp, as is provided by conventional processes, leads to the possibility for easier and more effective classification of the fibers because air suspensions and dry processes can be used rather than water suspensions and wet processes. It also leads to a product which is more suitable for transportation to a paper mill and subsequent repulping. It also produces fibers in the desired form for dry forming of paper webs if that process is desired to be used. The carrying out of the process of defiberizing nonaqueously also reduces the contamination of the fibers, which is caused by irreversible mixing and permeation of contaminants through the entire mass of fibers which occurs in the aqueous process. It is accordingly an object of the present invention to provide an improved process which provides a resultant dry fiber.

In accordance with the practice of the present invention, water is employed in the operation to protect the fibers during mechanical defiberization, yet a dry fiber results at the end of the process.

In the use of conventional defiberizing processes in the environment of water, the moisture content of the pulp after draining and pressing is usually between 30 and 50 percent. The remaining water can be removed by evaporative drying. In that case the fibers tend to become stuck to each other under the action of the Campbell Effect. After water is removed by evaporation, the remaining water is lodged inside the fibers and also in the smaller spaces between the fibers. These small aggregates of water, with very small radii of curvature of those parts of their surface which are in contact with the surrounding gas phase, exert very high unit forces (thousands of psi) which pull the fibers together. Then as the water is removed from such interfiber areas, hydrogen bonds are formed. The result of all this is a yield of clumps of dry fibers bonded together, rather than individual separated dry fibers. The disadvantage of such a product is known to those versed in the art of paper making.

Attempts to defiberize dry waste paper without a liquid lead to excessive damage of the fibers. Attempts to keep wet fibers (such as the yield from the water defiberization process after pressing) separated during drying by mechanical air or aerodynamic forces have not been successful. Either excess damage is done to the fibers or otherwise the effectiveness of the dispersing forces is not sufficient to keep the fibers apart.

Less fiber damage occurs when defiberization is carried out in a water suspension for at least two reasons. The presence of water in the fibers and near the bonded areas between the fibers, makes it easier to break the bonds. The water transmits the defiberizing shearing forces from the mechanical agitators to the fibers in a more uniform and milder fashion so that there are less concentrated forces applied to the fibers. Concentrated forces such as applied during dry defiberizing cut and break the fibers and remove fiberals or fines from the fibers. Another factor which may be involved is than when the fibers are surrounded by liquid, the heat generated by the work of deformation of the fibers is readily dispersed, thus preventing the build-up of excessive temperatures. A feature of the present invention is accordingly the utilization of moisture to distribute the forces to the waste in defiberization and yet the avoidance of the disadvantages of moisture which causes clumping and the other problems referred to above.

In accordance with the present invention, to achieve the advantages of defiberizing in a liquid, and preventing the glomeration of fibers into bonded clumps, the process utilized is as follows. While described principally as a continuous process, it will become apparent that it can be practiced as a batch process utilizing mechanisms as are described or referred to herein or as otherwise will become apparent to those versed in the paper making art.

The process principally involves the removal of air from the waste and the addition of a controlled amount of aqueous moisture, mechanical defiberization in a solution of nonaqueous liquid, the removal of the nonaqueous liquid and the addition of a fresh nonaqueous liquid, a second mechanical defiberization under pressure, the removal of aqueous moisture in a heated demoisturizer chamber, pressing the nonmiscible liquid from the pulp and completing the removal of the nonmiscible liquid by forcing superheated steam through the pulp. Modifications of certain steps and variation or shortening thereof will become more apparent from the description below.

Other advantages, features and objects will become apparent, as will equivalent mechanisms and methods, which are intended to be covered hereby, from the description of the preferred embodiments in the teaching of the specification, claims and drawings, in which:

DESCRIPTION OF THE DRAWINGS

The single FIGURE of the drawing is a schematic diagram showing method and mechanism constructed and operating in accordance with the principles of the present invention.

DESCRIPTION OF THE PREFERRED EMBODIMENTS

Waste paper, including some moisture content, plastic coating, wax and other contaminants, is introduced through a suitable inlet such as a hopper 11 into a chamber 12 containing a screw conveyor 13. As the waste paper advances toward the chamber waste paper outlet 9, a counter-current of superheated steam at atmospheric pressure is introduced at 14 to pass through the waste paper and exits at 10. The steam adds moisture to the paper to an extent controllable by the steam temperature and flow rate relative to the input flow rate of waste paper. This, of course, will be controlled in accordance with the moisture content of the paper and an automatic control may be provided for measuring the factors and controlling the rate of feed, and the superheated steam condition and rate of supply. Also, the steam drives out air which comes into the chamber with the waste paper so that a mixture of waste paper, moisture and steam passing out of the chamber at 9 is essentially free of air. For an additional control of the moisture added to the waste paper, a mechanical spray may be introduced at 15. A controlled moisture addition is required, and a preferable moisture content is approximately equal to fiber weight. A preferable range of moisture is in the range of 0.5 to 4 percent water by weight, for the resultant mixture which will contain approximately 2 percent pulp and 96 percent nonmiscible The mixture proceeds through a rotary valve 16 which may take various forms, but a mechanical valve having a rotor 17 with pockets therein will carry the waste to a mechanical pulper or defiberizer 19. The defiberizier 19 is maintained under pressure by a control 20 so that the rotary valve 16 prevents the escape of pressure.

A fluid having predetermined physical properties is introduced into the defiberizer 19 through the line 46. This fluid is immiscible in water. It has less affinity for cellulosic paper making fibers than water. It has a boiling point at atmospheric pressure which is higher than that of water. A preferred nonmiscible fluid meeting the above requirements is tetrachlorethylene. This fluid will also function as a suitable solvent for the removal of plastics and other foreign agents from the pulp.

The mechanical defiberizer 19 is a commercially available pulper such as known to the art as a hydropulper of Jones Pulp Master, or other similar structure. Features of these mechanical structures may be altered for the purposes herein described.

The pulping or defiberizing is carried out in a medium of approximately 96 percent nonmiscible fluid, 2 percent water and 2 percent pulp, although the range of nonmiscible fluid may vary from approximately 94 to 97.5 percent.

The water which was added to the waste paper has made it easier to break the bonds between the fibers. The water remains at the desired locations in the fibers and around the bonded area because the other fluid added which comprises the majority of the liquid medium in which the defiberizing occurs is immiscible in water. This other fluid also serves the purpose otherwise served by the water in a conventional defiberizing process, namely to transmit the defiberizing force through the fluid in a mild manner so that the fiber damage is minimized. The process is carried out in the pulper at an elevated pressure because it is desired to have the mixture at an elevated temperature. The elevated pressure prevents the water from boiling out of the waste paper. The elevated temperature is obtained by preheating the immiscible fluid in the heater 45 as will later be described.

From the defiberizer 19 the mixture of defiberized waste paper, water and immiscible fluid is directed into a separator which performs a screening and washing function.

The separator 21 in the form shown has a rotatable tubular shaped screen 22. The interior of the separator is divided into two compartments by a wall 27 having seals against the rotatable screen. Engaging the outer surfaces of the screen are rotary seals 25 which permit surfaces of the screen to be rotated with pulp fibers on the surface to pass the rotary seals into the exit chamber. As the mixture flows into the separator 21, the pulp fibers deposit on the outer surface of the rotary screen 22, and the immiscible liquid flows out through the outlet 23 controlled by a valve 24. With rotation of the screen, the fibers are carried into the exit chamber, and a fresh immiscible liquid entering through the inlet 26 flows radially outwardly through the screen to mix with the fibers and carry them out of the separator 21.

The fresh immiscible liquid is supplied through a rotary valve 30 from a heat exchanger heater 28. The liquid is received from a supply 29 delivering to the heat exchanger. The rate of flow through the separator is controlled by the outlet valve 24 and the inlet valve 30 which control the flow from the pressurized defiberizer 19.

The nonmiscible liquid passing out through the valve 24 is returned to a suitable recovery process in which contaminants are removed from the fluid so that the latter may be returned.

The fibers in the fresh clean fluid which leave the separator through the line 31 are directed to a second defiberizer 32 which serves to further disperse the fibers in the fluid medium. This defiberizer 32 is operated at a pressure higher than atmospheric which is maintained by regulation of the valve 30 and the outlet valve 34. These valves may be interconnected by a line 34a which controls them in concert so as to properly control the flow rate of the newly induced clean fluid into the system.

After dispersion of the waste fibers in the defiberizer 32, the fibers and fluid are directed into an evaporation demoisturizer surge tank 35. The valve 34 should be specially designed and be of the type which is essentially a variable orifice.

The demoisturizer tank 35 is maintained essentially at atmospheric pressure. The sudden release of pressure experienced by the fibers, moisture and immiscible fluid entering the tank 35 causes most of the water to evaporate from the fibers while the fibers are well dispersed in the fluid medium. With this dispersion being maintained by the turbulence induced by the flow through the valve 34 and furthermore by the boiling which accomplishes this evaporation. A certain amount of fluid medium will also evaporate in the tank 35. A combination of water vapor and fluid medium vapor is captured in the line 35a and is sent to a recovery system indicated schematically at 35b. The recovery system serves to separate the water from the fluid medium which is later returned to the process, such as by being delivered to the supply 29.

The tank 35 is suitably baffled by barriers 36. By the time the fibers and fluid medium flow past the baffles to the exit line 37, this mixture will have reached thermal equilibrium, and the fibers are sufficiently demoisturized so that they no longer have a tendency to agglomerate into clumps. The mixture is then fed to a mechanical press 38 which presses the immiscible fluid therefrom.

The press 38 may be one of various types of mechanical presses known to the art, such as a Jones Press Master. Most of the immiscible fluid is removed in the press and flows through the line 43 through a filter 44 and up to a heater 45 which feeds to the supply line 46 back to the defiberizer 19. Makeup immiscible fluid is supplied through the line 47.

The extracted fluid after filtration in the filter 44 is sufficiently clean so that it can be reheated and conducted back to the defiberizer 19 through the control valve 48.

The rejects taken out of the filter 44 may either be stripped of fluid by superheated steam and the remaining fines and fibers collected, or otherwise the mixture may be recycled into the system at at any number of suitable points such as in advance of the first or second defiberizers 19 or 32.

The fibers received from the mechanical press 38 are fed into a final chamber 39 which contains a screw conveyor 40. As the material proceeds to an outlet 42, superheated steam is again caused to flow through the chamber in a direction against the flow of fiber so as to remove the remaining immiscible fluid medium from the fibers by evaporation. The steam and fluid medium vapor passes out through the outlet 49 to be returned to a suitable recovery process for separation of the water from the fluid medium. The temperature and flow rate of the superheated steam fed to the chamber 39 may be so controlled so that it will remove all of the fluid medium from the fiber, but will not completely remove all of the water from the fibers. Therefore, the final discharge from the chamber 21 is relatively dry, separated fibers having some controlled predetermined moisture content, low enough that these fibers do not again glomerate into clumps nor bond to each other, but high enough so that irreversible damage to the cellulosic fibers has not occurred.

In accordance with the mechanism used operating under the process described, the objective has been served to obtain a controlled aqueous defiberization of waste paper to obtain dry, separated and undamaged fibers. The fluid medium which is selected serves the additional purpose of removing plastics, waxes and other contaminants from the waste paper. The fluid tetrachlorethylene is preferred, and other fluids such as trichlorethylene may be employed. The removal of the air at the initial stage enhances the recovery of the fluid medium.

We claim as our invention:

1. A mechanism for the recovery of high quality dry pulp from waste paper comprising in combination:
   first means adding a predetermined amount of aqueous moisture to said waste;
   a defiberizer connected to said means receiving and defibering said waste;
   means to pressurize the defiberizer;
   second means connected to said defiberizer adding a liquid nonmiscible in water to said waste so that defibering forces in said defiberizer will be transmitted to the fibers in the waste through said liquid and through the aqueous moisture in the fibers;
   an open demoisturizer chamber for operating at substantially atmospheric pressure connected to receive the waste from said second means for removing the aqueous moisture from the fibers to a predetermined dryness;
   pressure release means between said defiberizer and said demoisturizer chamber so that the chamber will operate at said atmospheric pressure;
   and a mechanical press connected to receive the waste from said chamber for substantially completely removing said nonmiscible liquid from the fibers.

2. A mechanism for the recovery of high quality substantially dry pulp from waste paper constructed in accordance with claim 1:
   including means associated with said first means for removing air from the paper waste wherein said air removal means and said first means adding aqueous moisture includes a structure for directing a flow of superheated steam through a chamber containing the waste.

3. A mechanism for the recovery of high quality substantially dry pulp from waste paper constructed in accordance with claim 2:
   wherein said first means includes means for directing a controlled liquid spray into the waste for regulating the moisture added thereto.

4. A mechanism for the recovery of high quality substantially dry pulp from waste paper constructed in accordance with claim 1:
   including a separator positioned after the defiberizer having a rotatable screen receiving the waste on the surface of the screen and removing the nonmiscible liquid with the screen carrying the waste into a chamber where a fresh liquid is added nonmiscible with aqueous moisture with the aqueous moisture remaining with the waste.

5. A mechanism for the recovery of high quality substantially dry pulp from waste paper constructed in accordance with claim 1:
   including a second defiberizer receiving the waste from the first defiberizer and a separator positioned between said defiberizer removing the nonmiscible liquid and adding a fresh nonmiscible liquid.

6. A mechanism for the recovery of high quality substantially dry pulp from waste paper constructed in accordance with claim 5:
   and including means for pressurizing said second defiberizer with the waste being discharged from the second defiberizer through a variable orifice into the demoisturizer chamber.

7. A mechanism for the recovery of high quality substantially dry pulp from waste paper constructed in accordance with claim 1:
   wherein heater means are provided so that said demoisturizer chamber contains liquid at substantially 212°F to evaporate a substantial amount of the aqueous moisture from the fibers.

8. A mechanism for the recovery of high quality substantially dry pulp from waste paper comprising in combination:
   a chamber having an advancing screw therein for receiving paper waste;
   means for directing a flow of superheated steam through said chamber to remove air therefrom and to add moisture;
   spray means in said chamber to control the moisture added to the waste;
   a first pulp defiberizer connected to receive waste from said chamber;

means for adding a nonmiscible liquid to said waste in said defiberizer so that the defiberizing forces will be transmitted to the fibers in the waste through said liquid and the aqueous moisture in the fibers;

a rotary valve between the chamber and the pulp or defiberizer for controlling the flow of pulp into the defiberizer;

a dual chambered separator with a rotary screen receiving the waste from the pulp or defiberizer and separating the nonmiscible liquid from the waste and having means adding a fresh nonmiscible liquid thereto;

means connected to the adding means for heating the fresh nonmiscible liquid;

a second defiberizer connected receiving the waste from the separator;

means for pressurizing said second defiberizer;

a demoisturizer chamber containing liquid at 212°F;

a variable orifice for directing waste from the second defiberizer to the demoisturizer chamber to release pressure to the demoisturizer chamber for the demoisturizer chamber to operate at substantially atmospheric pressure;

a mechanical press for receiving the waste from the demoisturizer chamber;

a final chamber with a through advancing means receiving the waste from the press;

and means for directing a flow of superheated steam through the waste in the final chamber to remove the remaining nonmiscible liquid therefrom.

9. A method for the recovery of high quality substantially dry pulp from waste paper comprising in combination the steps:

adding a predetermined amount of aqueous moisture to said waste;

mechanically defiberizing the waste under pressure in a solution of nonmiscible liquid so that defiberizing forces are transmitted to the fibers through the liquid and the aqueous moisture in the fibers;

releasing the pressure to atmospheric pressure;

removing the aqueous moisture from the fibers by subjecting them to an elevated temperature at substantially atmospheric pressure;

and applying a mechanical pressing pressure substantially completely removing the nonmiscible liquid from the fibers.

10. A method for the recovery of high quality substantially dry pulp from waste paper constructed in accordance with claim 9:

wherein air is removed from the waste prior to the mechanical defiberizing.

11. A merhod for the recovery of high quality substantially dry pulp from waste paper constructed in accordance with claim 9:

wherein the nonmiscible liquid is removed from the waste after the defiberizing and a fresh nonmiscible liquid is mixed with the waste and the waste is subsequently subjected to a second mechanical defiberization before removing aqueous moisture therefrom.

12. A method for the recovery of high quality substantially dry pulp from waste paper constructed in accordance with claim 11:

wherein the second mechanical defiberization is conducted at higher than atmospheric pressure.

13. A method for the recovery of high quality substantially dry pulp from waste paper constructed in accordance with claim 11:

wherein the nonmiscible liquids which are added to the waste are at an elevated temperature.

14. A method for the recovery of high quality substantially dry pulp from waste paper constructed in accordance with claim 9:

wherein the amount of aqueous moisture added to the waste is in the range of 0.5 to 4 percent of the waste plus nonmiscible liquid.

15. A method for the recovery of high quality substantially dry pulp from waste paper constructed in accordance with claim 11:

wherein the second defiberizing is conducted under pressure in the range of 20 to 50 psi.

* * * * *